United States Patent [19]

Kenealy

[11] Patent Number: 5,431,444

[45] Date of Patent: Jul. 11, 1995

[54] LAWNMOWER FIFTH WHEEL

[76] Inventor: Frank R. Kenealy, 3828 Devanshire St., Portage, Ind. 46368

[21] Appl. No.: 238,485

[22] Filed: May 5, 1994

[51] Int. Cl.$^6$ ............................................. B60R 27/00
[52] U.S. Cl. .................................. 280/767; 180/19.1; 56/DIG. 9
[58] Field of Search ...................... 180/19.1; 280/47.34, 280/239, 767, 763.1; 56/1, 208, 218, DIG. 9

[56] References Cited

U.S. PATENT DOCUMENTS

| | | | |
|---|---|---|---|
| 3,537,720 | 11/1970 | Irgens | 280/47.34 X |
| 3,693,996 | 9/1972 | Hardy | 280/47.34 |
| 4,522,420 | 6/1985 | Hannappel | 280/767 X |
| 5,330,221 | 7/1994 | Sutton | 280/239 X |

FOREIGN PATENT DOCUMENTS

| | | | |
|---|---|---|---|
| 550161 | 8/1956 | Belgium | 280/767 |
| 8908043 | 9/1989 | WIPO | 280/239 |

Primary Examiner—Brian L. Johnson

[57] ABSTRACT

A lawnmower fifth wheel including a centrally disposed wheel engaging the earth at a site between the operator and the lawnmower rearmost wheels thereby providing sufficient stability to enable the operator to lean heavily upon the lawnmower handles without adversely affecting a mowing operation. A rigid support engaging the centrally disposed wheel and a portion of the lawnmower handle is provided. A lateral brace is also provided to stabilize the centrally disposed wheel and lawnmower handle mechanical system.

1 Claim, 4 Drawing Sheets

LAWNMOWER FIFTH WHEEL

BACKGROUND OF THE INVENTION

1. Field of the Invention

The present invention relates to agricultural equipment attachments providing aid to the handicapped and elderly, and more particularly pertains to a lawnmower fifth wheel which may be employed to provide partial physical support for a human operator thereof.

2. Description of the Prior Art

The use of support attachments for agricultural equipment is known in the prior art. More specifically, agricultural equipment attachments heretofore devised and utilized for providing aid to the handicapped and elderly are known to consist basically of familiar, expected and obvious structural configurations, notwithstanding the myriad of designs encompassed by the crowded prior art which have been developed for the fulfillment of countless objectives and requirements.

The present invention is directed to improving devices for a lawnmower fifth wheel in a manner which is safe, secure, economical and aesthetically pleasing.

For example, U.S. Pat. No. 3,791,116 to Wykhuls discloses a handle support for a walk-behind mower comprising a pair of support arms pivotally affixed to a cross member attached to a rear portion of the lawnmower motor. The Wykhuls invention is devised to compensate for the generally flimsy nature of stamped sheet metal lawnmower decks wherein the deck warps objectionably when a handle affixed thereon is used to rotatably lift the front portion of the lawnmower for negotiating turns and performing other operations. There is no human physical support advantage in the Wykhuls invention. The present invention comprises a single wheeled frame devised to provide at least partial physical support to a human lawnmower operator while not impeding the movements thereof.

In U.S. Pat. No. 4,026,365 to Andersson et al. a caster wheel supported agricultural implement with self-locking caster wheel is disclosed. The Andersson et al. invention comprises a tool carrying frame for agricultural implements wherein one caster wheel is latched against free trailing. The Andersson et al. invention has no provision for supporting a human user of agricultural equipment to which the invention is attached. The present invention provides a partial physical support for a human operator of agricultural equipment and more specifically a lawnmower.

In U.S. Pat. No. 4,162,605 to Olin et al. a rear wheel support apparatus for a three wheel vehicle is described. The Olin et al. invention comprises an angularly disposed tubular sleeve and spindle driven wheel attachment means primarily for use on mowing machines. The Olin et al. invention has no provision for supporting an elderly or handicapped individual user of the mowing machine or other equipment employing the invention therewithin. The present invention comprises an axle mounted singular wheel affixed to a four wheeled mower in a manner which provides substantial bodily support for a human user.

In U.S. Pat. No. 3,962,849 to Stoessel et al. a caster wheel arm is disclosed for supporting the windrow pickup header of a forage harvester. Disadvantages in this prior art lies in a lack of an attachment system for a common lawnmower and furthermore in an inability to provide physical support for a human user. The present invention comprises a framework and single wheel attaching to a lawnmower for the purpose of partially supporting the body of an elderly or disabled user.

U.S. Pat. No. 3,455,406 to Soteropulos discloses an agricultural machine with alternate caster wheel positions. The disclosure teaches a traction unit for self propelled equipment having a right triangular main frame wherein a single caster wheel may be removably disposed in any of two mounting positions thereon. The disclosure makes no provision for supporting elderly or handicapped persons involved in using the equipment having the Soteropulos invention affixed thereon. The present invention comprises a single wheel affixed to a portion of a power lawnmower in a manner which provides at least partial physical support to a user thereby permitting the elderly and handicapped to use lawnmowing equipment.

In this respect, the lawnmower fifth wheel according to the present invention substantially departs from the conventional concepts and designs of the prior art, and in so doing provides an apparatus primarily developed for the purpose of enhancing the maneuverability of a power lawnmower and furthermore providing some physical support for a human operator.

Therefore, it can be appreciated that there exists a continuing need for new and improved lawnmower fifth wheel which can be employed to aid the operator of lawnmower type agricultural equipment by providing physical support. In this regard, the present invention substantially fulfills this need.

As illustrated by the background art, efforts are continuously being made in an attempt to improve agricultural equipment attachments. No prior effort, however, provides the benefits attendant with the present invention. Additionally, the prior patents and commercial techniques do not suggest the present inventive combination of component elements arranged and configured as disclosed and claimed herein.

The present invention achieves its intended purposes, objects, and advantages through a new, useful and unobvious combination of method steps and component elements, with the use of a minimum number of functioning parts, at a reasonable cost to manufacture, and by employing only readily available materials.

SUMMARY OF THE INVENTION

In view of the foregoing disadvantages inherent in the known types of agricultural equipment attachments now present in the prior art, the present invention provides an improved lawnmower fifth wheel construction wherein the same can be utilized for supporting a lawnmower thereby permitting an operator to lean thereon without adverse effect such as tipping. As such, the general purpose of the present invention, which will be described subsequently in greater detail, is to provide a new and improved lawnmower fifth wheel apparatus and method which has all the advantages of the prior art agricultural machinery attachments and none of the disadvantages.

The invention is defined by the appended claims with the specific embodiment shown in the attached drawings. For the purpose of summarizing the invention, the invention may be incorporated into an axle mounted wheel affixed to a forked frame attached to an existing portion of a power lawnmower. The wheel engages the terrain at a site more closely in vertical alignment with the position of a user handle grip than the rearmost existing lawnmower wheels thereby maintaining lawnmower stability throughout periods wherein the user leans upon the handle grips.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In as much as the foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the disclosed specific methods and structures may be readily utilized as a basis for modifying or designing other structures for carrying out the same purposes of the present invention. It should be realized by those skilled in the art that such equivalent methods and structures do not depart from the spirit and scope of the invention as set forth in the appended claims.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

Therefore, it is an object of the present invention to provide an improved lawnmower fifth wheel which provides stability to a lawnmower thereby enabling elderly or handicapped persons to operate the lawnmower.

It is therefore an additional object of the present invention to provide a new and improved lawnmower fifth wheel which has all the advantages of the prior art agricultural attachments aiding individual users and none of the disadvantages.

It is another object of the present invention to provide a new and improved lawnmower fifth wheel which may be easily and efficiently manufactured and marketed.

It is a further object of the present invention to provide a new and improved lawnmower fifth wheel which is of a durable and reliable construction.

An even further object of the present invention is to provide a new and improved lawnmower fifth wheel which is susceptible of a low cost of manufacture with regard to both materials and labor, and which accordingly is then susceptible of low prices of sale to the consuming public, thereby making such lawnmower fifth wheels economically available to the buying public.

Still yet another object of the present invention is to provide a new and improved lawnmower fifth wheel which provides in the apparatuses and methods of the prior art some of the advantages thereof, while simultaneously overcoming some of the disadvantages normally associated therewith.

Still another object of the present invention is to provide a new and improved lawnmower fifth wheel detachably affixable to an existing power lawnmower.

Yet another object of the present invention is to provide a new and improved lawnmower fifth wheel which enhances the maneuverability of an existing power lawnmower by individuals having certain movement impairments by providing an improved turning response in proportion to differing distributions of leaning weight disposed upon lawnmower handle grips.

Even still another object of the present invention is to provide a new and improved lawnmower fifth wheel of adequate strength to be employed as a walking aid to assist in lawn mowing operations undertaken by elderly or handicapped individuals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention. The foregoing has outlined some of the more pertinent objects of this invention. These objects should be construed to be merely illustrative of some of the more prominent features and applications of the present invention. Many other beneficial results can be attained by applying the disclosed invention in a different manner or by modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
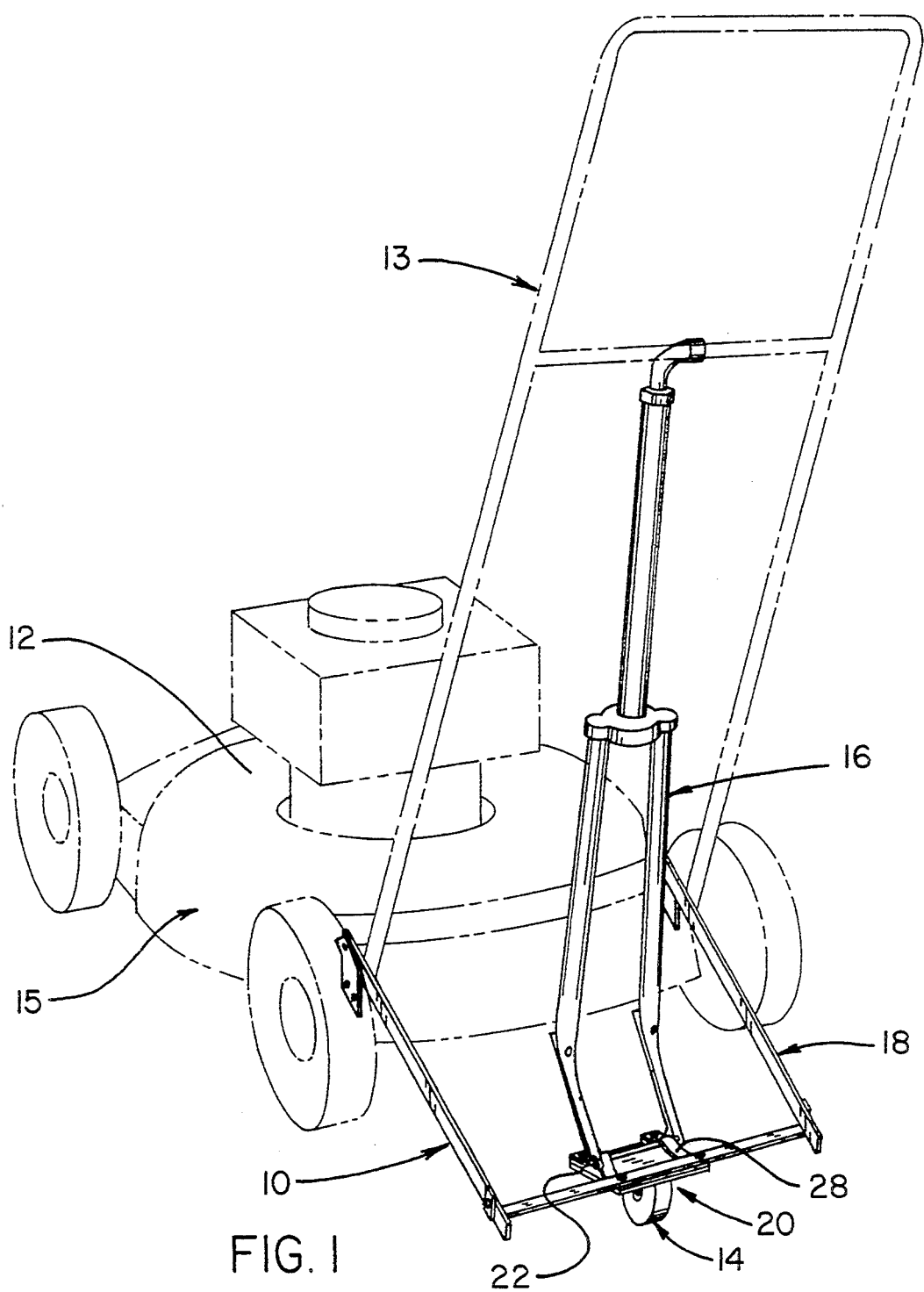
FIG. 1 is a perspective view of the lawnmower fifth wheel showing an attachment to an existing lawnmower.

With reference now to the drawings, and in particular to FIG. 1 thereof, a new and improved lawnmower fifth wheel embodying the principles and concepts of the present invention and generally designated by the reference numeral 10 will be described.

From an overview standpoint, the lawnmower fifth wheel 10 is adapted for use with an existing power lawnmower 12 to provide enhanced stability and a sturdy platform upon which an operator may lean. See FIG. 1. Caster assembly 14 is affixed to a telescoping forked first frame 16 and a partially rectangular second frame 18 wherein the first and second frames 16 and 18 are affixed to existing portions of lawnmower 12 at handle 13 and housing 15 attachment sites.

Figure 2:
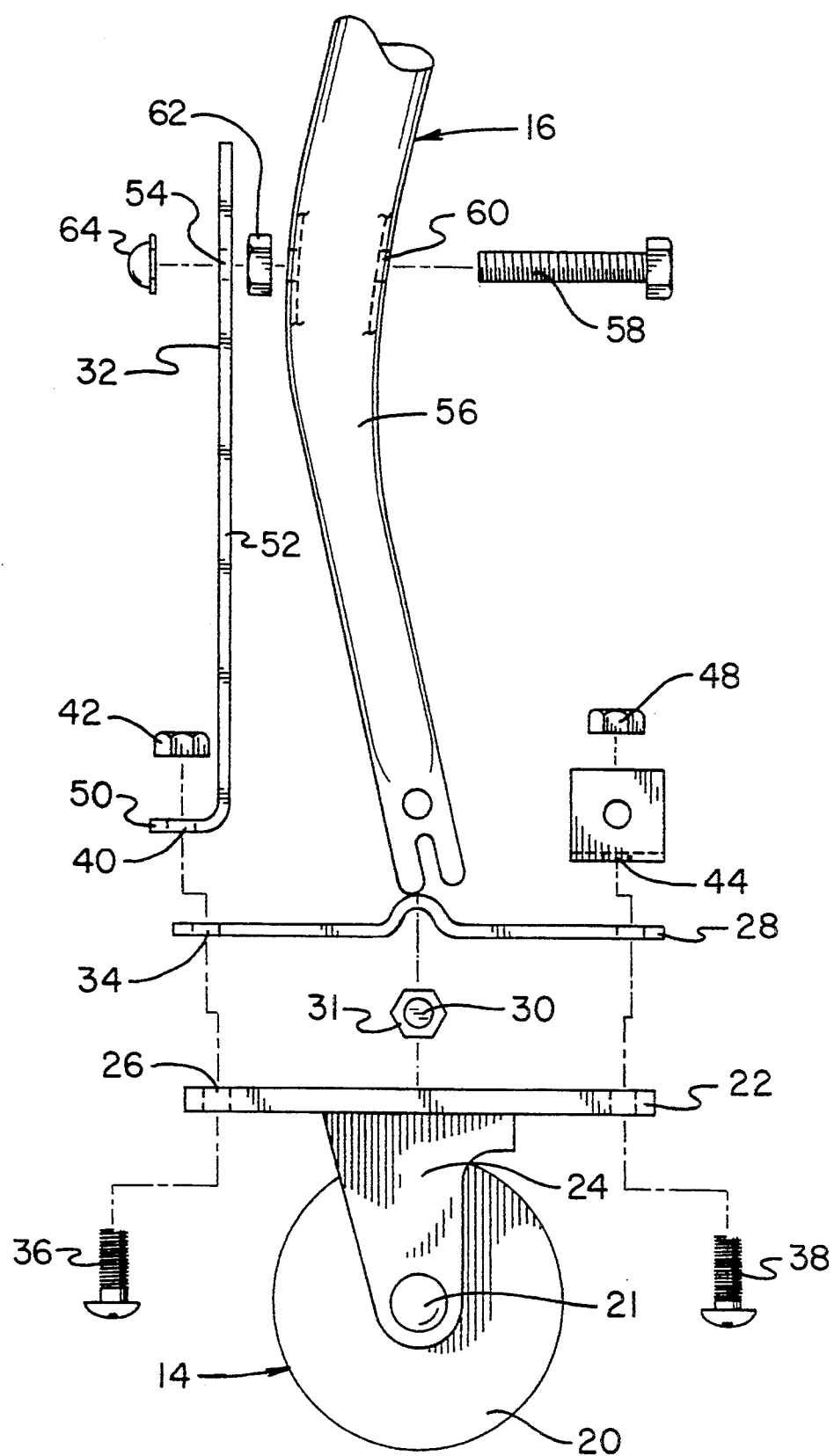
FIG. 2 is a fragmentary exploded side elevational view of the lawnmower fifth wheel.

More specifically, it will be noted that the lawnmower fifth wheel 10 comprises a caster assembly 14 affixed to both first frame 16 and second frame 18 wherein said caster assembly 14 comprises a wheel member 20, a caster mounting plate 22, and various ball and bushing bearing members permitting free movement of various components therein. Wheel member 20 may rotate upon a fixed axle 21 or upon an axle susceptible to swivel action during use. Axle 21 is affixed to forked wheel mount 24 using through holes provided therein. Forked wheel mount 24 is devised to provide a substantially horizontal disposition of both axle 21 and mounting plate 22. Caster assembly 14 may be procured separately and be selected from a wide variety of existing caster assembly designs having a substantially planar caster mounting plate 22 with a series of mounting holes 26 disposed therethrough. See FIG. 2. Caster assembly 14 is affixed to telescoping forked first frame 16 using strap members 28, through bolt 30 and cooperating nut 31, and stiffening bracket 32. Strap members 28 comprise a pair of substantially flattened elongated plates having a centrally disposed elevated bolt engagement portion and identical end portions having through holes 34 therein. Through holes 34 are in substantial alignment with through holes 26 of mounting plate 22 and furthermore strap members 28 are secured to mounting plate 22 using bolt members 36 and 38. Bolt member 36 additionally engages a through hole 40 of stiffening bracket 32 and in cooperation with nut member 42 tightly joins mounting plate 22, strap member 28, and stiffening bracket 32. Bolt member 38 additionally engages a through hole 44 of partially rectangular second frame 18 and in cooperation with nut member 48 tightly joins mounting plate 22, strap member 28, and second frame 18. Stiffening bracket 32 comprises an L-shaped elongated plate having a short leg 50 with through hole 40 disposed therein and a long leg 52 having through hole 54 disposed therein. Stiffening bracket 32 is affixed to a first tine 56 of telescoping forked first frame 16 wherein bolt 58 passes through hole 60, threadedly engages first nut 62, engages through hole 54, and is ultimately tightly held by cap nut 64. Washers and lockwashers may be used throughout whenever bolts or other threaded fasteners are employed herein. A similar set of stiffening bracket 32, strap member 28, bolt 36 and nut 42, bolt 38 and nut 48, bolt 58, nut 62 and cap nut 64 is affixed to a second tine 70 of telescoping forked first frame 16.

Figure 3:
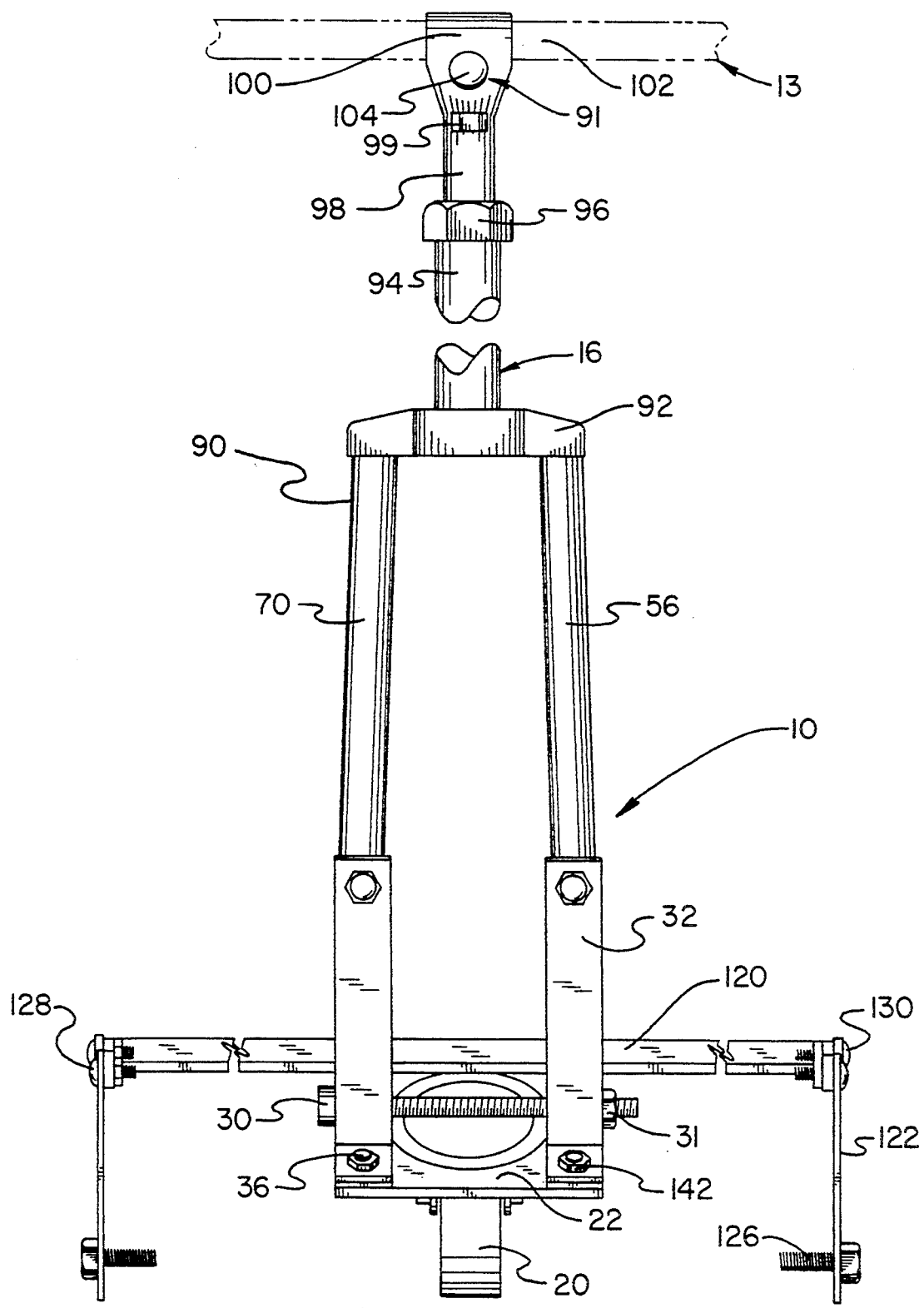
FIG. 3 is a rear elevational view of the lawnmower fifth wheel in a typical mounting orientation.

Telescoping forked first frame 16 comprises a bifurcated member 90 and a lawnmower engagement member 91. See FIG. 3. Bifurcated member 90 comprises tine 56, tine 70, base 92, tubular central portion 94, and tube support nut 96. Lawnmower engagement member 91 comprises a tubular portion 98 slidably engaging tubular central portion 94, cylindrical wedge engagement bolt 99, and a handle clamp 91. Lawnmower engagement member 91 comprises a clamping portion 100 which grips a tubular member 102 of handle 13 being held by carriage bolt 104 and nut 106. Cylindrical wedge engagement bolt 99 threadedly engages a wedge member positioned within tubular portion 98 and furthermore interiorly clampedly engages said tubular portion 98 in response to tightening torque applied to a head of bolt 99. Tube support nut 96 threadedly engages an end of tubular central portion 94 and furthermore inhibits lateral movement of tubular portion 98 within tubular central portion 94.

Figure 4:
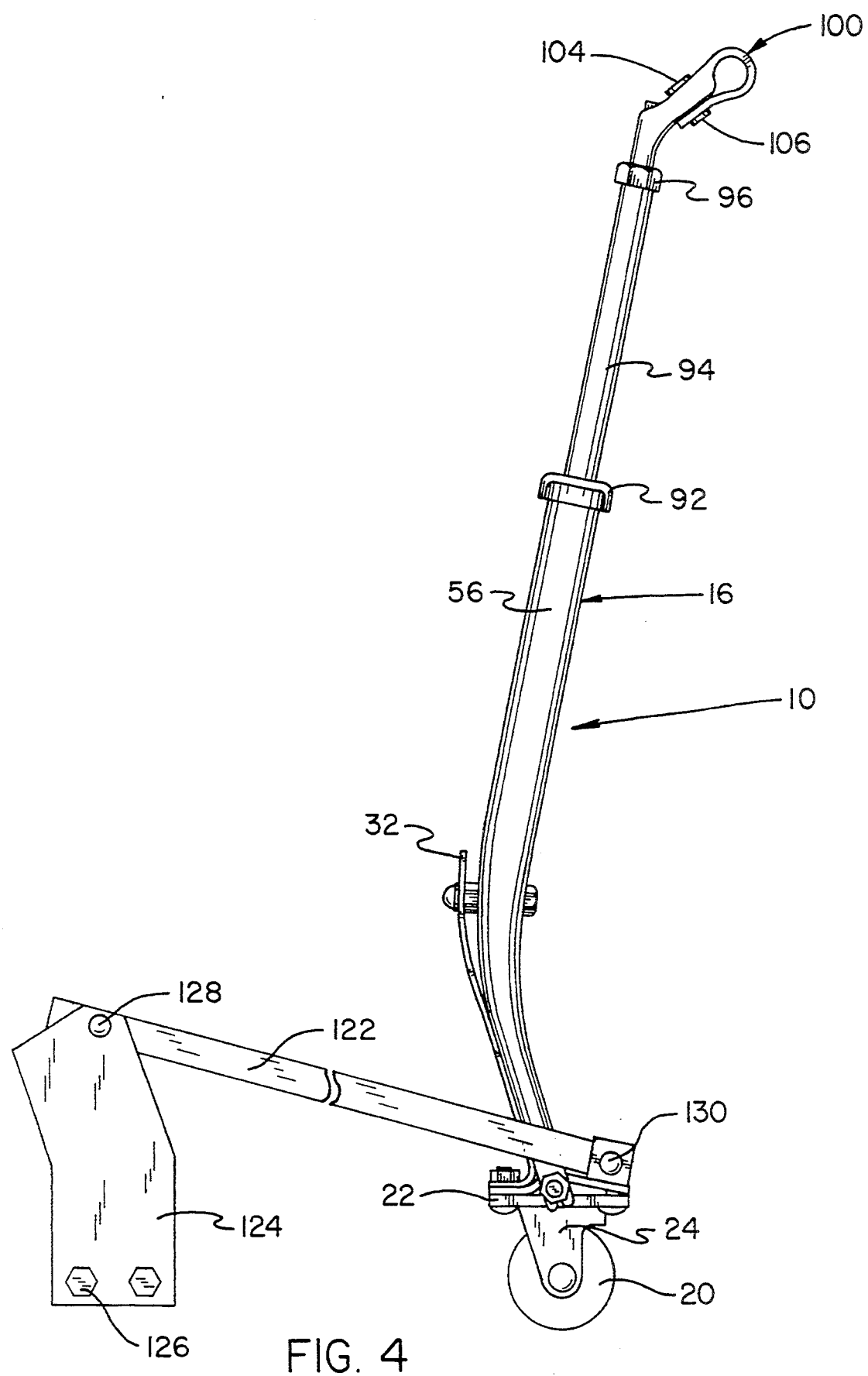
FIG. 4 is side elevational view of the lawnmower fifth wheel in a typical mounting orientation.

Partially rectangular second frame 18 comprises a cross-member 120, two sidepieces 122, and a lawnmower housing attachment plate 124. See FIG. 4. Lawnmower housing attachment plate 124 comprises a flattened plate member having a plurality of through holes disposed therein and furthermore lawnmower housing attachment bolts 126 engage said through holes and threadedly engage a cooperative portion of lawnmower housing 15 thereby tightly affixing the attachment pleat 124 to the lawnmower housing 15. Sidepiece 122 is affixed to the lawnmower attachment plate 124 using bolt 128. Each sidepiece 122 comprises a substantially flattened elongated member and may be curved or bent as required to engage crossmember 120 using threaded fastener 130. Cross-member 120 comprises an elongated barlike member having longitudinal threaded holes penetrating each end portion and two through holes 44 equidistantly disposed a distance from a cross-member 120 centerline wherein said distance corresponds to the spacing of mounting holes disposed within caster mounting plate 22.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. In as much as the present disclosure includes that contained in the appended claims as well as that of the foregoing description. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed as being new and desired to be protected by Letters Patent of the United States is as follows:

1. A lawnmower fifth wheel for providing physical support of a portion of an operator's body mass comprising, in combination:
   a caster assembly having a freely rotating wheel with an aperture formed therethrough, an axle disposed within the aperture formed through the wheel, a forked wheel mount coupling with the axle, an upper portion of the forked wheel mount integral with a caster mounting plate, a cross-piece secured to the caster mounting plate;
   a telescoping member having a bifurcated portion and a locking slidably engaging tubular series portion, the bifurcated portion having a base portion, the base portion having tine members extending downwardly therefrom, the tine members engaging an upper portion of the caster mounting plate of the caster assembly, the base portion having a tubular central portion extending upwardly therefrom, the tubular series portion having a tubular portion, the tubular portion slidably engaging tubular central portion, the tubular portion having a clamping portion, the clamping portion selectively engaging a handle of a lawnmower;
   a lateral stabilizing means having a pair of lawnmower frame attachment plates affixed to opposing sides of an existing lawnmower, the attachment plates-extending outwardly coupling with a side piece which are connected at opposite ends of the cross-piece of the caster assembly.

* * * * *